C. S. LEWIS.
MEASURING DEVICE.
APPLICATION FILED JUNE 4, 1912.
1,066,127.
Patented July 1, 1913.
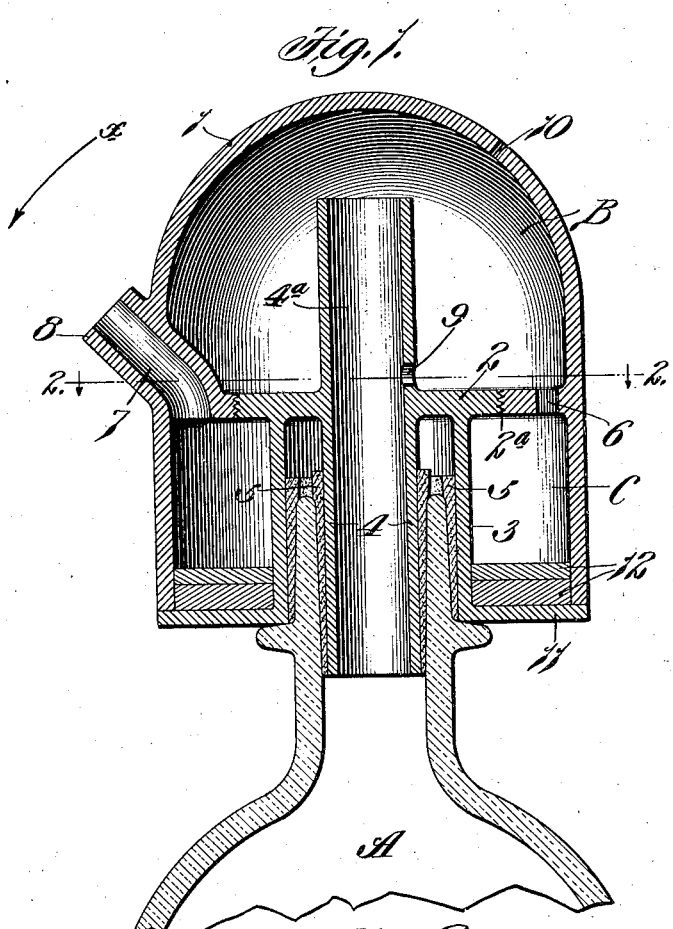
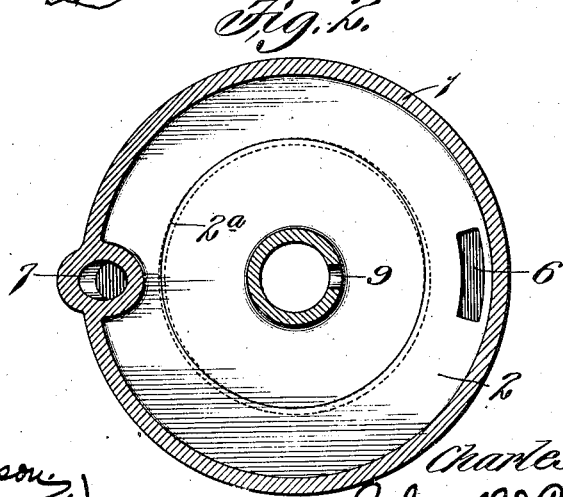

UNITED STATES PATENT OFFICE.

CHARLES S. LEWIS, OF ST. LOUIS, MISSOURI.

MEASURING DEVICE.

1,066,127.  Specification of Letters Patent.  Patented July 1, 1913.

Application filed June 4, 1912. Serial No. 701,517.

*To all whom it may concern:*

Be it known that I, CHARLES S. LEWIS, a citizen of the United States, residing at St. Louis, Missouri, have invented a certain new and useful Improvement in Measuring Devices, of which the following is a full, clear, and exact description, such as will enable others skilled in the art to which it appertains to make and use the same.
This invention relates to devices that are used for measuring liquid, semi-liquid, and granular or powdered materials.

One object of my invention is to provide a device that is adapted to be applied to a container and which is so constructed that it will permit only a predetermined quantity of material to be discharged when the container is tilted or arranged in such a position that the material therein can escape.
Another object is to provide a device of the character above-mentioned that will automatically measure a predetermined quantity of material whenever the container is tilted or actuated to discharge the material that was previously measured.

Another object is to provide a device of the character described which also acts as a cap or closure for the receptacle or container on which it is used.
And still another object is to provide an inexpensive measuring device that comprises only a few substantial parts which can be cleaned easily.

Other objects and desirable features of my invention will be hereinafter pointed out.

Figure 1 of the drawings is a vertical sectional view of a measuring device constructed in accordance with my invention;
and Fig. 2 is a horizontal sectional view taken on the line 2—2 of Fig. 1.

Referring to the drawings which illustrate the preferred form of my invention, A designates a container which may be a bottle, a can, a cask, or, in fact, any suitable kind of receptacle provided with a discharge opening for permitting the material in same to escape.

My improved measuring device consists of a casing or shell 1 whose interior is divided into two chambers B and C which are separated from each other by a horizontally disposed partition 2, the cubical contents of the upper chamber B being greater than the cubical contents of the lower chamber C. The device can be applied to the receptacle on which it is used in various ways. It can be provided on its under side with a socket or recess whose annular wall 3 surrounds a vertical flange on the receptacle, such, for example, as the top portion of the neck of a bottle; it can be provided with a tubular-shaped portion 4 that projects into the discharge opening of the receptacle; or it can be provided with both of said parts or members as herein shown. The annular wall 3 of the socket in the lower end of the device, or the tubular-shaped part 4 on the device, or both of said parts can be so designed that they fit the coöperating portion of the receptacle snugly, or annular packing members 5 can be arranged between the device and the coöperating part of the receptacle on which the device is mounted.

A port or opening is formed in the partition 2 preferably at a point in alinement with the discharge opening in the receptacle A so as to permit the material to flow from said receptacle into the receiving chamber B. In the preferred form of my invention as herein shown, the tubular-shaped portion 4 of the device establishes communication between the receptacle and chamber B, and said tubular-shaped portion is provided with an extension 4ª that projects into the chamber B, thus forming an open-ended passageway leading from the receptacle A and the receiving chamber B.

The material that enters the chamber B escapes into the measuring chamber C through one or more ports in the partition 2, the device herein shown having an elongated slot 6 formed in the partition 2, as shown clearly in Fig. 2. The discharge opening through which the measured material escapes from the chamber C preferably consists of a port in the partition 2 that communicates with a duct 7 formed in a spout 8 that projects laterally from the casing 1 of the device, as shown in Fig. 2. It is not essential, however, that the device be provided with a spout for, if desired, the duct through which the material escapes from the measuring chamber C could terminate flush with the outer surface of the casing 1. A port 9 of less area than the opening 6 is formed in the extension 4ᵃ of the tubular-shaped member 4 at a point just above the upper side of the partition 2 so as to permit air to enter the receptacle or container A when the material is flowing out of same and also to form an overflow opening that permits the surplus material in the receiving chamber B to flow back into the receptacle A, as hereinafter described. Air is admitted to the upper chamber B through an air port or opening 10 formed in the dome-shaped top of the casing 1.

As shown in the drawings, the overflow port 9, the opening 6 in the partition 2, and the air port 10 in the casing are preferably formed at one side of the device and diametrically opposite the discharge spout 8. Consequently, when the container A is tilted or inclined in such a manner that the measuring device moves in the direction indicated by the arrow $x$ in Fig. 1, the spout 8 being located on the under side of the device, some of the material in the container will flow through the open-ended tubular-shaped member 4 directly into the receiving chamber B. When the container A is restored to its former upright position the material that has entered the chamber B will flow from said chamber through the opening 6 in the partition into the measuring chamber C, the excess material or material which cannot enter the chamber C, escaping from the receiving chamber B back into the container, through the overflow opening 9 in the extension of the tubular-shaped member 4. The chamber C now contains a predetermined quantity of material, and when the container is again tilted or actuated in the manner previously described, the material in the chamber C will escape through the discharge duct 7 in the spout of the device. At the same time, namely, when the measured material is being discharged, the material in the container A is flowing into the upper chamber B through the tubular-shaped member 4, thus causing the chamber B to be filled automatically at the time the chamber C is being emptied.

From the foregoing it will be seen that each time the container or receptacle A is tilted or moved into a certain position a predetermined quantity of material is discharged from the device, and when the container is restored to its upright position the material which is next to be discharged is measured accurately. It is immaterial whether the container is merely tilted partway over or completely inverted for when sufficient material has entered the upper chamber B to cover the overflow port 9 and the air inlet port 10, the flow of the material from the container will be cut off automatically owing to the fact that no air can enter the receptacle, the ports 9 and 10 thus forming an air-lock which governs the quantity of material that escapes from the container A into the upper chamber B of the device.

The specific construction of the device is immaterial so far as my broad idea is concerned, and it can be formed from any suitable material, either sheet material or material that can be cast or molded. I prefer to form the device in two parts from material that can be cast or molded, the lower part comprising the center portion of the partition 2, the tubular-shaped member 4 and its extension, the annular wall 3 of the socket on the under side of the device, and the bottom wall 11 of the measuring chamber C, all integrally connected together. The upper part of the device comprises the casing or shell 1 having a dome-shaped top and side walls which terminate, and preferably bear upon the top face of the plate portion 11 of the bottom part, the discharge spout 8 being preferably formed integral with the casing 1 and the casing being provided on its inner side with an annular flange that forms part of the horizontal partition 2 which separates the chambers B and C, the coöperating partition portions on the top and bottom parts of the device being screwed together at 2ᵃ, as shown in Fig. 1. A device of the construction above-described comprises only two substantial parts which are inexpensive to manufacture and it can be taken apart easily for cleansing by simply unscrewing the two parts at the point where the coöperating partition portions of same are connected together. If desired, packing can be arranged between the lower edge of the casing 1 and the top face of the bottom plate portion 11 on which the edge of the casing bears, but this is not necessary if the device is formed of metal, for there will be sufficient resiliency in the metal to insure a tight joint between these parts.

In order to provide for measuring different quantities, one or more split-ring-shaped fillers 12 are arranged in the measuring chamber C so as to permit the cubical contents of said chamber to be varied.

I will not attempt to enumerate the purposes for which my improved device may be used but it is particularly adapted for use on bottles containing materials that are dispensed in small quantities owing to the fact that it acts as an ornamental cap or closure for the bottle and permits only a predetermined quantity of material to be discharged whenever the bottle is tilted or moved into a position to discharge its contents.

Having thus described my invention, what

I claim as new and desire to secure by Letters Patent is:

1. A measuring device comprising a receiving chamber that communicates with the supply of material to be measured, a measuring chamber adapted to receive a certain quantity of material from said receiving chamber, said receiving member having an outlet through which the excess material escapes back to the source of supply, and said measuring chamber having an outlet opening through which the measured material flows out of the measuring chamber when the device is held in a certain position.

2. A measuring device adapted to be applied to a receptacle which contains material to be dispensed, said device comprising a receiving chamber, a measuring chamber, means for conducting the material from the receptacle into said receiving chamber when the receptacle is arranged in a certain position, said receiving chamber having an outlet opening through which the material passes from the receiving chamber into the measuring chamber when the receptacle is arranged in a different position and said receiving chamber having means for supplying air to the receptacle when the material is passing from same into the receiving chamber.

3. A measuring device adapted to be applied to a receptacle which contains material to be dispensed, said device comprising a receiving chamber, a measuring chamber provided with means for supplying air to same, means for conducting the material from the receptacle into said receiving chamber when the receptacle is arranged in a certain position, said receiving chamber having an outlet opening through which a predetermined quantity of material passes from the receiving chamber into the measuring chamber when the receptacle is arranged in a different position and said receiving chamber also being provided with an overflow opening through which the excess material escapes from the receiving chamber back into the receptacle, and a discharge duct leading from the measuring chamber.

4. A measuring device adapted to coöperate with a receptacle which contains material to be dispensed, said device comprising a receiving chamber and a measuring chamber, means for conducting the material from the receptacle into said receiving chamber, said receiving chamber having an outlet opening through which the material passes from said receiving chamber into the measuring chamber and also an overflow opening through which the excess material escapes from the receiving chamber back into the receptacle, the receiving chamber having an opening for supplying air to same so as to permit the material to flow from said chamber into the measuring chamber, and a discharge duct communicating with the measuring chamber.

5. A combined cap and measuring device, comprising a casing or shell, a partition in said shell that divides the interior of same into a measuring chamber and a receiving chamber, means adapted to be inserted in the mouth of the receptacle that contains the material which is to be dispensed for conducting the material from the receptacle into said receiving chamber, said partition having an opening through which the material passes from the receiving chamber into the measuring chamber and said shell having an opening which admits air into the receiving chamber, and a spout through which the measured material is discharged when the receptacle on which the device is used is held in a certain position.

6. A measuring device comprising a casing or shell provided with a closed top and an open lower end, an annular flange on the interior of said shell that forms part of a horizontally disposed partition, a lower part having a coöperating partition portion that is connected to said flange and also a portion that coöperates with said shell to form a measuring chamber whose top wall consists of said partition, said partition having an opening, a tubular-shaped member projecting upwardly from the partition portion of said lower part into the upper portion of the shell, and a discharge duct leading from said measuring chamber.

7. A measuring device comprising a casing or shell provided with a closed top and an open lower end, an annular flange on the interior of said shell that forms part of a horizontally disposed partition, a lower part having a coöperating partition portion that is connected to said flange and also a portion that coöperates with said shell to form a measuring chamber whose top wall consists of said partition, said partition having an opening, a tubular-shaped member projecting upwardly from the partition portion of said lower part into the upper portion of the shell, a discharge duct leading from said measuring chamber, and means on said lower part for coöperating with the receptacle on which the device is used.

8. A measuring device comprising a shell or casing having a closed top and an open lower end, an annular flange on the interior of said shell that forms part of a horizontally disposed partition, a lower part having a portion that forms the bottom of said shell and a partition portion that is screwed into said flange, an open-ended tubular-shaped portion on said lower part whose lower end is spaced away from the walls of a socket in said lower part, said partition having an opening, an overflow opening formed in said tubular-shaped portion above said partition, means for establishing communication between the upper portion of said shell and the atmosphere, and a discharge duct communicating with the space on the under side of said partition.

In testimony whereof I hereunto affix my signature in the presence of two witnesses, this first day of June 1912.

CHARLES S. LEWIS.

Witnesses:
WELLS L. CHURCH,
GEORGE BAKEWELL.